United States Patent Office 3,645,939
Patented Feb. 29, 1972

3,645,939
COMPATIBILIZATION OF HYDROXYL CONTAINING MATERIALS AND THERMOPLASTIC POLYMERS
Norman G. Gaylord, New Providence, N.J., assignor to U.S. Plywood-Champion Papers Inc., Hamilton, Ohio
No Drawing. Filed Feb. 1, 1968, Ser. No. 702,204
Int. Cl. C08f 29/10, 29/20 29/30
U.S. Cl. 260—17.4 GC
18 Claims

ABSTRACT OF THE DISCLOSURE

Composites are prepared from a material containing hydroxyl groups, such as cellulose, starch, polyvinyl alcohol, sand, metal or glass and a thermoplastic material containing labile atoms, such as polyethylene or polyvinyl chloride, by reacting the materials with a coupling agent, such as maleic anhydride, in the presence of a free radical initiator. An improved method for incorporating fillers or reinforcing agents into thermoplastic polymers is also provided by precoating the filler or reinforcing agent with a thermoplastic material containing labile atoms in the presence of a coupling agent and a free radical initiator.

This invention relates to a process for compatibilizing a material containing free hydroxyl groups with a polymer which is otherwise incompatible therewith and to composite systems obtained thereby. More particularly, this invention relates to a process for compatibilizing such materials by bringing them together in the presence of an ethylenically unsaturated carboxylic acid, substituted carboxylic acid or carboxylic acid anhydride and a free radical precursor or free radical generating agent.

The rapid growth of plastics in areas such as in packaging has markedly affected the traditional use of cellulose in these areas. The use of plastics has not only displaced many paper products but has opened up new areas of use. The major properties of plastics which render them useful in those areas formerly dominated by cellulose are their thermoplasticity and their ability to be formed and shaped such as by extrusion, molding, foaming and postforming. Cellulose does not possess these properties unless it has been chemically modified to convert it into a plastic such as cellulose acetate.

Because cellulose, and other polyhydric polymers such as starch, are much less expensive than conventional thermoplastic materials and also because they possess certain desirable physical and chemical properties, it would be advantageous to be able to process them in the same manner as conventional thermoplastics. However, in previous attempts to prepare composites of cellulose and a non-reactive thermoplastic polymer by admixing cellulose and a thermoplastic polymer, the cellulose has appeared to virtually absorb the thermoplastic polymer. Final properties of such a mixture, particularly flow properties, are generally adversely affected.

It is an object of this invention to compatibilize a polyhydric material, such as cellulose, with a thermoplastic polymer which is otherwise non-compatible therewith.

It is another object of this invention to compatibilize a material containing free hydroxyl groups, such as cellulose, starch, clay, sand, etc., with a polymer containing labile atoms.

It is a further object of this invention to provide a composite of such materials which has improved flow and mechanical properties.

It is yet another object of this invention to provide a technique for the essentially simultaneous or consecutive reaction of a polymer containing labile atoms, such as polyethylene, with a component or substrate containing hydroxyl groups, such as metal, glass, cellulose or clay and other siliceous minerals through a coupling agent, such as maleic anhydride, whereby the adhesion between the polymer and the hydroxyl-containing substrate is markedly improved.

It is still another object of this invention to provide an improved method for incorporating fillers or reinforcing materials into polymers.

These and other objects are attained by the practice of this invention which, briefly, comprises compatibilizing at least two normally incompatible materials, at least one of the materials being a hydroxyl group containing material and at least one other of the materials being a thermoplastic polymer having labile atoms which provide sites for the formation of free radicals. This is accomplished by contacting the normally incompatible materials in the presence of an ethylenically unsaturated carboxylic acid or substituted carboxylic acid or anhydride under conditions which will generate free radicals on the polymer. The ethylenically unsaturated carboxylic acid is thereby chemically bonded onto the polymer and is reacted with the hydroxyl groups on the hydroxyl group containing material by means of esterification and hydrogen bonding. Thus, the ethylenically unsaturated acid acts as a coupling agent between the polymer and the hydroxyl group containing material. The resultant composition is characterized by having improved affinity or improved compatibility compared with a mixture of the normally incompatible material in the absence of reaction with the ethylenically unsaturated acid.

As used herein, the term "compatibilizing" is intended to include rendering the mixture of two or more polymeric materials permanently miscible so as to form a homogeneous composition which has useful plastic properties and which does not separate into its component parts.

The material containing hydroxyl groups may be an inorganic material such as clay, sand, glass or metal. In one embodiment of this invention, the material containing hydroxyl groups is a polyhydric polymer having a high degree of hydrogen bonding. Such polyhydric polymers include, for example, polysaccharides, such as cellulose, starch, amylose, amylopectin, tapioca, dextrin, etc.; polyvinyl alcohol; and mixtures thereof. When cellulose is used as the polyhydric polymer, it may be in the form of wood pulp, cotton, cotton linters, regenerated cellulose (viscose rayon), wood flour, ground newspapers, etc. Polyvinyl alcohol which may be used as the polyhydric polymer includes commercially available grades of polyvinyl alcohol which are obtained by the substantially complete hydrolysis of polyvinyl acetate. It is to be understood that some unhydrolyzed acetate groups may be contained on the polyvinyl alcohol. Highly hydrogen bonded derivatives of the polyhydric polymer may also be employed.

The thermoplastic polymers having labile atoms which provide sites for the formation of free radicals include polymers of olefins (e.g., homopolymers and copolymers of ethylene, propylene, 1-butene, etc.) including copolymers with polar monomers (e.g. ethylene-vinyl acetate copolymers); acrylic resins or elastomers (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polystyrene; copolymers of styrene and other vinyl monomers such as acrylonitrile; vinyl polymers such as homopolymers and copolymers of vinyl acetate, vinyl chloride, alkyl vinyl ether and vinyl butyral; homopolymers and copolymers of dienes such as polybutadiene, polyisoprene, polychloroprene, butadiene-styrene copolymers, isobutylene-isoprene copolymers and other unvulcanized elastomers including natural rubber. Chemical derivatives of such polymers and copolymers of ethylenically unsaturated monomers or dienes (e.g. chlorinated polyethylene, chlorinated polypropylene, chlorinated isoprene copolymers, salts of ethylene-maleic anhydride, ethylene-acrylic acid, ethylene-methacrylic acid, styrene-maleic anhydride, alkyl vinyl ether-maleic anhydride, butadiene-maleic anhydride and isoprene-maleic anhydride copolymers, and completely or partially hydrolyzed ethylene-vinyl acetate copolymers may also be used. Polymers of cyclic monomers may also be used (e.g. homopolymers and copolymers of ethylene oxide, propylene oxide, tetrahydrofuran, propiolactone, caprolactone, caprolactam and ethylene imine). Copolymers of carbon monoxide and sulfur dioxide may also be used (e.g. copolymers of carbon monoxide with ethylene and ethylene imine and copolymers of sulfur dioxide with α-olefins, styrene, vinyl chloride and butadiene). Homopolymers and copolymers of carbonyl compounds may also be used (e.g. homopolymers and copolymers of formaldehyde, acetaldehyde, butyraldehyde, chloral, etc.). Condensation polymers may also be used such as polyester and alkyd resins which are obtained by the condensation of a polyhydric alcohol and a polycarboxylic acid. Examples of polycarboxylic acids which may be used to form the polyester resin include phthalic acid, phthalic anhydride, succinic acid, adipic acid, isophthalic acid, terephthalic acid, maleic anhydride, etc. The polyhydric alcohols which may be used in the preparation of the polyester or alkyd resin may include the glycols, such as ethylene glycol, propylene glycol, etc. Polyamide resins may also be used (e.g. polymers obtained by the condensation of a polycarboxylic acid such as adipic acid, terephthalic acid and dimer acid with a polyamine such as ethylene diamine, hexamethylene diamine and diethylene triamine). Polyurethanes may also be used (e.g. polymers obtained by reaction of a diisocyanate such as toluene diisocyanate and 4,4'-diphenylmethane diisocyanate with a polyol such as polyethylene oxide, polypropylene oxide, polytetramethylene glycol and hydroxyl-terminated polyesters. Other thermoplastic resins based on bisphenol such as polycarbonates, polysulfones and polysulfonates as well as poly-2, 5-dimethylphenylene oxide may also be used. Thermoplastic epoxy resins may be used. Epoxy resins include the condensation products of bisphenol and epichlorohydrin, epoxidized drying oils, the glycidyl ethers of glycerol, epoxylated novolac resins, etc. The thermoplastic resin may be a resin which is capable of being thermoset or cured but which is contacted with the hydroxyl group containing material at temperatures and conditions which will not thermoset or cure the resin. Such resins include silicone resins and elastomers and thermosetting acrylic resins. The labile atom on the polymer may be, for instance, a hydrogen atom or a halogen atom.

The ethylenically unsaturated carboxylic acid or anhydride coupling agent used in the practice of this invention is preferably dicarboxylic such as maleic acid, maleic anhydride, fumaric acid, citraconic acid, or itaconic acid. Maleic anhydride is the preferred coupling agent. Monocarboxylic acids, such as acrylic acid and methacrylic acid, may also be used.

The means for generating free radicals on the thermoplastic polymer is preferably accomplished by using a free radical catalyst such as a peroxide (e.g. dicumyl peroxide, methylethylketone peroxide, benzoyl peroxide, di-t-butyl peroxide, and 2,5-dimethyl-2,5-di(t-butyl peroxy)hexane). A more detailed compilation of free radical initiators which may be used is set forth at pages II–3 to II–51 of "Polymer Handbook," Interscience Publishers (1966), the disclosure of which is incorporated herein by reference. Free radicals may also be formed on the thermoplastic polymer by other means such as by thermal fission or radiation or exposure to oxygen or ozone.

In preparing the compatibilized compositions of this invention, it is preferred to use from about 5 to 95% by weight of the thermoplastic polymer containing labile atoms, from about 5 to 95% by weight of the material containing hydroxyl groups, and from 0.1 to 20% by weight of the ethylenically unsaturated carboxylic acid or anhydride coupling agent. A particularly suitable composition contains from about 70 to 80% by weight of cellulose or clay, from about 15 to 25% by weight of polyethylene or other polymer, about 10% by weight of maleic anhydride and from about 1 to 2% by weight of peroxide catalyst.

The compatibilized composition may be formed by charging the thermoplastic polymer containing labile atoms, the hydroxyl group containing material, the ethylenically unsaturated acid or anhydride and a free radical generating catalyst to a mill and subjecting the mixture in the mill to high shear forces.

When the thermoplastic polymer containing labile atoms and the material containing hydroxyl groups are contacted with the ethylenically unsaturated carboxylic acid or anhydride and free radical initiator, the carboxylic acid or anhydride simultaneously or consecutively adducts or reacts with the polymer and esterifies and forms hydrogen bonds with the material containing hydroxyl groups. Thus, the carboxylic acid links the normally incompatible materials together. When polyethylene is used as the thermoplastic material, cellulose as the material containing hydroxyl groups and maleic anhydride as the coupling agent, the polyethylene and cellulose are linked together by means of the maleic anhydride forming a block copolymer containing a succinic half acid ester bridge between cellulose and polyethylene segments. The polyethylene becomes, in this manner, a side chain of the cellulose. The reaction which occurs may be represented as follows:

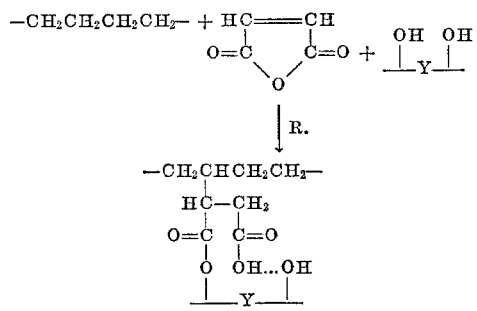

wherein R. represents the free radical initiator and Y is the residue of a cellulose molecule. The segment of the block copolymer derived from the ethylenically unsaturated carboxylic acid or anhydride may be polymeric, e.g. polymaleic anhydride, in lieu of or in addition to the single unit shown in the equation.

It is essential that the thermoplastic polymer containing labile atoms, the material containing hydroxyl groups and the ethylenically unsaturated carboxylic acid or anhydride be contacted so that reaction may occur between the acid and the other two materials substantially simultaneously. If cellulose, for example, is first reacted with maleic anhydride to form a cellulose maleate half ester, the half ester will not subsequently readily react with polyethylene even in the presence of a free radical initiator. Moreover, if it is attempted to react polyethylene with maleic anhydride at 150° C. in a reaction chamber which is not sealed, reaction does not readily occur in the presence of free radical initiator and the maleic anhydride sublimes out of the reaction chamber, whereas, when even a small amount of cellulose is present, sublimation of the maleic anhydride is prevented or minimized and reaction occurs.

The coupling reaction between the thermoplastic polymer and the hydroxyl containing material proceeds most conveniently if all constituents are present together. The reaction thus leads to an essentially one-step compatibilization process. In this respect it differs from the two-step process in which a hydroxyl containing material is admixed with a copolymer prepared from an unsaturated carboxylic acid such as an ethylene-acrylic acid copolymer, or a graft copolymer such as is obtained by polymerizing acrylic acid in the presence of polyethylene under the influence of ozone or radiation or an adducted polymer such as is obtained by reacting maleic anhydride with a low molecular weight polyethylene wax containing one or more olefinic linkages, the latter being obtained by pyrolysis or thermal degradation of high molecular weight polyethylene.

Since the components need not be used in stoichoimetric ratio, some of the components may still be present in the final compatibilized product in unreacted form. An excess of hydroxyl group containing material, such as cellulose, will act as a filler in the final product while an excess of the thermoplastic material, such as polyethylene, acts as a binder and as a plasticizer in the final product. The compatibilized product may also be blended in a further step with additional hydroxyl group containing material and/or thermoplastic polymer.

In preparing the compatibilized composites of this invention, other conventional additives such as pigments (e.g., $TiO_2$ or aluminum powder), fillers, plasticizers, stabilizers, lubricants, etc. may be incorporated into the composition at any time during processing.

The homogeneous composites of this invention may be molded into articles by conventional injection molding, compression molding or transfer molding techniques. They may be formed into sheets or films or used as intermediate layers to bond layers of resin to layers of paper. When the hydroxyl group containing material is sand, the composite may be formed into sheets of sand paper in which the sand is integrally bonded. Some of the compositions of this invention which include cellulose compatibilized with a thermoplastic polymer may be used to form translucent or transparent products such as bottles, thus permitting the use of cellulose in areas where plastics now predominate.

When the homogeneous composites of this invention are formed into sheets or films, the latter may be subjected to subsequent mechanical treatment such as uniaxial or biaxial stretching to enhance the strength. When the hydroxyl group containing material is fibrous, such as cellulose or asbestos, the stretching operation will aid in the alignment of the fibers further enhancing the strength of the sheet or film.

Composites containing polyethylene and maleic anhydride have a tendency to adhere very strongly to all kinds of substrates, especially to metals. Therefore, it is preferred that the portions of molding equipment which come into contact with such composites be lubricated, coated or laminated with a material which acts as a barrier, such as a mold release agent, or a polytetrafluoroethylene, polytrifluoromonochloroethylene or polyamide-imide resin or film.

The following examples illustrate the best modes contemplated for carrying out this invention. In the examples, all percents are by weight unless otherwise stated:

EXAMPLE 1

The following materials (25 g. total charge) are mixed in a Brabender Plasticorder mixer at 150° C. for 20 minutes:

Material: Amount, percent
Bleached mixed hardwood pulp (of paper making grade) _____ 75
Polyethylene having a density of 0.92 and a melt index of 2 _____ 21.4
Maleic anhydride _____ 2.4
Dicumyl peroxide _____ 1.2

A charge of 25 g. is mixed in the Brabender Plasticorder at 150° C. for 20 minutes. To prevent the charge from sticking to the walls of the machine, 50% of the cellulose is fed dry into the operating, heated mixing chamber. Then, ⅓ of the polyethylene, ⅓ of the peroxide-maleic anhydride mixture and 10% of the cellulose are charged. The addition of polyethylene, peroxide-maleic anhydride mixture and cellulose in the same order and quantities is repeated twice followed by the addition of the remaining 20% dry cellulose. In this manner, charging takes 4–6 minutes and ensures an easy discharge and a clean machine. The product is discharged and the discharged, somewhat lumpy, product is then ground in a Waring Blendor for 10 minutes to produce a somewhat coarse powder.

A film is prepared from the ground powder by pressing 3 g. of the powder in a hydraulic press at 160° C. using 1 minute at contact pressure to heat the material, followed by 5 minutes at 40,000 lb. ram pressure.

In order to determine the flow properties of the composite prepared in this example, a 3.0 g. sample is pressed between press polished parallel plates at 340° F. for 1 minute at 30,000 lbs. constant ram pressure, then transferred to a cold press and cooled under 30,000 lbs. constant ram pressure. The resulting disc is accurately weighed and its area measured. Dividing the area by the weight, the flow is caluclated as $cm.^2/g$. Alternately, a standard area may be cut from the center of the disc and by dividing by its weight the flow may be calculated. The two methods show excellent agreement. The flow of the composition is 19.0 $cm.^2/gm$.

EXAMPLES 2–4

The process of Example 1 is repeated varying the amounts of materials as indicated in Table 1. The flow and flexibility of the compatibilized compositions increases with increasing percentages of polyethylene:

TABLE 1

| Example No. | Content (percent) | | | | Flow, $cm.^2/gm.$ |
|---|---|---|---|---|---|
| | Cellulose | Polyethylene | Peroxide | Maleic anhydride | |
| 2 | 79.2 | 17.8 | 1.0 | 2.0 | 21 |
| 3 | 69 | 26.5 | 1.5 | 3.0 | 25 |
| 4 | 50 | 47.6 | 0.8 | 1.6 | 32 |

Floor tile prepared by compression molding the composite of Example 2 are quite scratch resistant but may easily be cut, drilled and machined. The molded articles have good tensile, flexural and compressive properties.

EXAMPLES 5–8

The process of Example 1 is repeated substituting an ethylene-vinyl acetate copolymer (Elvax 210) containing 27 to 29% vinyl acetate for the polyethylene. Approximately two-thirds of the vinyl acetate in the copolymer is present as polyvinyl acetate branches. The materials are used in the amounts indicated in Table 2. The flow and flexibility of the products are better than corresponding products containing polyethylene. Moreover, substitution of mixed hardwood cellulose by wood flour and ground newspaper also results in improved flow and flexibility.

TABLE 2

| Example No. | Percent | | | | Flow, $cm.^2/g.$ |
|---|---|---|---|---|---|
| | Cellulose | Copolymer | Peroxide | Anhydride | |
| 5 | 75 | 21.4 | 1.2 | 2.4 | 33 |
| 6 | 50 | 47.6 | 0.8 | 1.0 | 42 |
| 7 | [1] 75 | 21.4 | 1.2 | 2.4 | 40 |
| 8 | [2] 75 | 21.4 | 1.2 | 2.4 | 39 |

[1] Wood flour superfine cellulose substituted for mixed hardwood pulp.
[2] Ground newspaper substituted for mixed hardwood pulp.

A sheet formed from the composite of Example 8 is useful as a mulching sheet in agricultural areas. Since the sheet is black, it will prevent the growth of weeds in the soil beneath the sheet. Due to the high cellulosic content, the film is biodegradable and, therefore, on decomposing, increases the organic matter in the soil.

Test bars compression molded from the composites of Examples 5 and 7 are found to have high impact strength and low deflection temperatures.

EXAMPLE 9

According to the process described in Example 1, a composite is prepared comprising 75.0% of mixed hardwood pulp, 13.9% of polyvinyl chloride (Bakelite QYSJ–5), 8.4% of dibutyl phthalate, 1.6% of maleic anhydride and 1.1% of dicumyl peroxide. The dibutyl phthalate is mixed in the Brabender with the other components. A flexible sheet is prepared from the homogeneous mass.

EXAMPLE 10

The process of Example 1 is repeated substituting an acrylic rubber (Cyanacryl) for the polyethylene. Sheets prepared from the composite are quite flexible.

EXAMPLES 11–15

The process of Example 1 is repeated in Examples 11 and 12, substituting in each example for the cellulose an equal amount of amylose and amylopectin, respectively. In Examples 13 and 14, the processes of Examples 11 and 12 are repeated substituting the ethylene-vinyl acetate copolymer of Example 5 for the polyethylene. In Example 15, the process of Example 13 is repeated substituting tapioca for the amylose. The composites of all these examples are transparent and have better flow than that of Example 1.

EXAMPLES 16 to 17

By the process of Example 1, composites are prepared comprising 75.0% of polyvinyl alcohol, 21.4% of the copolymer of ethylene and vinyl acetate, 2.4% of maleic anhydride and 1.2% of dicumyl peroxide. In Example 16, a low molecular weight polyvinyl alcohol being 98% hydrolyzed (Vinol FH–100) is used; and in Example 17, a high molecular weight polyvinyl alcohol being 99.7% hydrolyzed is used. The resultant composites have good flow and flexibility.

Sheets prepared from the composites of Examples 13, 14, 15 and 17 are boiled in hot water to extract any unreacted polyol. This treatment removes 28%, 51%, 48.5% and 25.6%, respectively, of the total polyol present in the film made from each example. The resultant films are microporous and may be used as microporous membranes.

When the material containing hydroxyl groups is an inorganic filler such as clay, a chemical bond is formed between the filler and the thermoplastic resin. The clay thus acts as a reinforcing agent in the system. Many types of clay may be used such as beater clay, coating clay and filler clay. Films containing as much as 60% clay are pliable, coherent structures. At lower clay contents, the flexibility is even greater. Up to about 45% of clay may be used without significantly influencing the water vapor permeability of films. Greater opacity may be imparted to the compatibilized mixture by incorporating from about 5–10% of $TiO_2$ based on the amount of clay in the mixture.

Coherent films may be obtained even when the clay content is as high as 80%, in contrast to when the maleic anhydride is omitted. The reinforcing action and/or the coupling of the clay-polyethylene composition is shown by the lowered flow values in the presence of the maleic anhydride-catalyst combination. Films pressed between two polyimide sheets are readily separated from the sheets when the composition contains the anhydride reactant, while blank tests without anhydride yield compositions which cannot be removed when the clay content is less than 75%. On the other hand, while blank tests yield removable material at greater than 75% clay content, the products are incoherent. In some cases, the polyethylene flows out on pressing, leaving separated clay and polyethylene areas, in the absence of maleic anhydride and peroxide.

The following examples illustrate the use of clay as the material containing hydroxy groups in the practice of this invention.

EXAMPLE 18

The following materials are mixed in a Brabender Plasticorder at 130° C. for 15 minutes:

| Material: | Amount, percent |
|---|---|
| Clay | 50.0 |
| Polyethylene | 46.4 |
| Maleic anhydride | 2.4 |
| Dicumyl peroxide | 1.2 |

The order of mixing the ingredients is important. For optimum performance, ⅓ of the clay is charged to the mixing chamber, followed by ⅓ of the maleic anhydride-peroxide mixture and ⅓ of the polyethylene, followed by the same procedure twice repeated. In this manner, the clay adsorbs the maleic anhydride and subsequent reaction with the polyethylene readily occurs under the influence of the peroxide catalyst. When the polyethylene and maleic anhydride are mixed in the absence of the clay, the anhydride tends to sublime out of the heated mixing chamber.

The compatibilized mixture may be processed in a manner usual for filled or unfilled thermoplastic resins, e.g., extruded into film or pipe, compression molded into shaped objects, injection molded, etc.

EXAMPLES 19–20

The process of Example 18 is repeated using varying amounts of materials as indicated in Table 3. Films 5 mil thick are molded from the compatibilized mixture obtained in each example and the water vapor transmission (WVT) is determined according to ASTM E96–63T. The results shown in Table 3 indicate that the practice of this invention results in cross linking of the polyethylene and the inorganic filler and decreased permeability.

TABLE 3

| | Percent | | | | |
|---|---|---|---|---|---|
| Example | Polyethylene | Clay | $TiO_2$ | Maleic anhydride/ dicumyl peroxide | WVT, g./m.²/ 24 hr. |
| Control | 100 | 0 | 0 | 0 | 21.0 |
| Do | 85.7 | 0 | 0 | 9.5/4.8 | 7.5 |
| 19 | 47.0 | 45 | 5 | 2.0/1.0 | 10.6 |
| 20 | 57.6 | 35 | 5 | 1.6/0.8 | 8.0 |

The practice of this invention also provides an improved method for the incorporation of fillers or reinforcing agents in polymers. In this embodiment, a hydroxyl group containing filler or reinforcing agent, such as clay, silica, glass, asbestos, etc. is precoated with a thermoplastic polymer, such as polyethylene by the coupling reaction hereinabove described to provide a powdery product comprising particles of the hydroxyl group containing material having polymer chemically bonded to the surfaces thereof.

For example, clay may be precoated with polyethylene by admixing clay and up to 15% by weight of polyethylene (based on the total weight of clay and polyethylene) with maleic anhydride and peroxide for a period of 20 minutes. The precoated clay may then be blended and compatibilized with a thermoplastic material, such as polyethylene, in various proportions to give a polymer composition containing a filler or reinforcing agent. Articles molded from the resultant compositions have improved elongation properties as compared to identical compositions except for the omission of the coupling agents.

The following example illustrates the precoating of clay with polyethylene and the compatibilization of the precoated clay with polyethylene.

EXAMPLE 21

The following materials are mixed in a Brabender Plasticorder mixer at 130° C. for 20 minutes:

| Material: | Amount, parts by weight |
|---|---|
| Low density polyethylene | 10 |
| Beater clay | 90 |
| Dicumyl peroxide | 1.7 |
| Maleic anhydride | 3.4 |

In charging these materials to the mixer, the clay, maleic anhydride and dicumyl peroxide are added first, followed by addition of the polyethylene. The product obtained following mixing is a fine powder comprising polyethylene coated on and chemically bonded to clay particles.

The pretreated clay thus obtained is blended with various amounts of polyethylene in a Brabender Plasticorder at 150° for 20 minutes to yield products containing, respectively, 30% and 50% clay, based on the total weight of the composition. The resultant compositions are molded into 20 mil films at 320° F. under 40,000 pounds ram pressure for 5 minutes. The resultant films have a smooth surface as contrasted to the coarse surface of a film prepared as described above except for the omission of maleic anhydride in the clay pretreating step.

The breaking strength of polyethylene compositions filled with pretreated clay as described above decreases as the clay level is increased to 30% by weight and then increases to the level of unfilled polyethylene when the clay level is increased to 50% by weight. The yield strength of such compositions increases and the ultimate elongation decreases as the amount of clay is increased.

Compatibilization may also be accomplished by laminating a layer of thermoplastic polymer, such as polyethylene, to a layer of material containing hydroxyl groups, such as cellulose pulp, paper or wood, by coupling or bonding the layers together by a simultaneous or consecutive reaction with maleic anhydride in the presence of a peroxide free radical catalyst. The maleic anhydride and peroxide may be applied to any of the layers which are to be laminated and the layers then laminated in a press at an elevated temperature. Alternatively, the peroxide and catalyst may be sprayed or otherwise applied to a continuous web or board. The treated board is then passed under a stream of molten polyethylene at a temperature adequate to decompose the peroxide which then generates free radicals on the polyethylene.

The following examples illustrate the lamination of sheets of polyethylene between milk carton boards:

EXAMPLES 22–25

In these examples, milk carton stock boards are dried in an oven at 100° C. to constant weight. The boards and/or polyethylene sheets are then treated as indicated in Table 4 wherein "MA" indicates treatment with maleic anhydride, "Peroxide" indicates treatment with t-butyl peroxypivalate, and "MA-Peroxide" indicates preliminary treatment with maleic anhydride and subsequent treatment with t-butyl peroxypivalate. When the board is treated with maleic anhydride, one surface is exposed to the vapor by placing the board over a tray in which 5 g. of maleic anhydride is evaporated at 100° C. The board is covered by a glass plate. The exposure time varies from 2 to 10 minutes. When the polyethylene sheet is treated with maleic anhydride, the sheet is suspended in a flask filled with maleic anhydride vapor at 100° C. for 3 to 4 minutes. The weight increase of the board or polyethylene sheet is measured as maleic anhydride take-up. Peroxide catalyst in the form of a 7.5% solution of t-butyl peroxpivalate in hexane is sprayed on the polyethylene film or the board.

After treatment, two strips of board, 2 in. wide, are sandwiched with a polyethylene sheet in between. Since the paper is treated on one side only, the treated side is placed in contact with the polyethylene. The laminate is then pressed in a hydraulic press at 130° C. at about 550 p.s.i. for 5 minutes.

The bonding or adhesion is tested by tying to delaminate the sandwich. If this can be done only by tearing the paper apart, the bonding is considered as "good." If the paper layers can be separated without too much damage to the paper surface, the bonding is considered as "poor."

For purposes of comparison, laminates are also prepared from boards and polyethylene sheets wherein neither have been treated with maleic anhydride or peroxide (Control A), wherein the board is treated with maleic anhydride but no peroxide is used on the board or polyethylene sheet (Control B), and wherein the polyethylene sheets are treated with peroxide but no maleic anhydride is used (Control C).

The results shown in Table 4 demonstrate that improved adhesion is obtained when both maleic anhydride and peroxide are used, regardless of the surface to which they are applied.

TABLE 4

| Example | Treatment Board | Treatment Polyethylene | Maleic anhydride takeup, mg./in.² | Bonding |
|---|---|---|---|---|
| Control A | None | None | | Poor. |
| Control B | MA | do | 0.18 | Do. |
| Control C | None | Peroxide | | Do. |
| 22 | MA-peroxide | None | 12.5 | Good. |
| 23 | MA | Peroxide | 14.1 | Do. |
| 24 | MA | do | 4.28 | Do. |
| 25 | None | MA-peroxide | 0.29 | Do. |

Other compatibilized compositions may be prepared employing the procedures set forth in the preceding examples and in the more general description of this invention set forth hereinabove.

I claim:

1. A process for compatibilizing at least two normally incompatible polymers, at least one of said polymers being a highly hydrogen bonded polyhydric polymer and at least one of said polymers being a thermoplastic polymer having labile atoms which provide sites for the formation of free radicals, which comprises contacting a mixture of from 5 to 95% by weight of said polyhydric polymer and from 5 to 95% by weight of said thermoplastic polymer in the presence of from 0.1 to 20% by weight of an ethylenically unsaturated carboxylic acid or anhydride under conditions which generate free radicals on said polymer, whereby said ethylenically unsaturated carboxylic acid or anhydride reacts with and couples said thermoplastic polymer and said polyhydric polymer.

2. A process for compatibilizing at least two normally incompatible polymers, at least one of said polymers being a highly hydrogen bonded polyhydric polymer and at least one of said polymers being a thermoplastic polymer having labile atoms which provide sites for the formation of free radicals, which comprises contacting a mixture of from 5 to 95% by weight of said polyhydric polymer and from 5 to 95% by weight of said thermoplastic polymer in the presence of from 0.1 to 20% by weight of an ethylenically unsaturated dicarboxylic acid or anhydride and a free radical initiator, whereby said ethylenically unsaturated dicarboxylic acid or anhydride reacts with and couples said polymers, the resultant compatibilized composition being characterized by having improved flow and mechanical properties.

3. A process for compatibilizing at least two normally incompatible polymers, at least one of said polymers being a highly hydrogen bonded polyhydric polymer and at least one of said polymers being a thermoplastic polymer having labile atoms which provide sites for the formation of free radicals, which comprises contacting a mixture of from 5 to 95% by weight of said polyhydric polymer and from 5 to 95% by weight of said thermoplastic polymer in the presence of from 0.1 to 20% by weight of maleic anhydride and a free radical initiator, whereby said maleic anhydride reacts with and couples said polymers, the resultant compatibilized composition being characterized by having improved flow and mechanical properties.

4. A process as defined in claim 3 wherein said highly hydrogen bonded polyhydric polymer is a member selected from the group consisting of polysaccharides, polyvinyl alcohol and mixtures thereof.

5. A process as defined in claim 3 wherein said highly hydrogen bonded polyhydric polymer is cellulose.

6. A process as defined in claim 3 wherein said thermoplastic polymer is polyethylene.

7. A process as defined in claim 3 wherein said thermoplastic polymer is an ethylene-vinyl acetate copolymer.

8. A process as defined in claim 3 wherein said thermoplastic polymer is polyvinyl chloride.

9. A process as defined in claim 3 wherein said thermoplastic polymer is an acrylic rubber.

10. A process as defined in claim 3 wherein said polymers maleic anhydride and free radical initiator are mechanically mixed under conditions of high shear.

11. A process as defined in claim 2 wherein said thermoplastic polymer is selected from the group consisting of olefin polymers and vinyl polymers.

12. A compatible composite of normally incompatible polymers comprising from 5 to 95% by weight of at least one thermoplastic polymer containing labile atoms which provide sites for the formation of free radicals, and from 5 to 95% by weight of at least one highly hydrogen bonded polyhydric polymer, said materials being coupled to each other by reaction with from 0.1 to 20% by weight of an ethylenically unsaturated acid or anhydride.

13. A compatible composite of normally incompatible polymers comprising from 5 to 95% by weight of a thermoplastic polymer containing labile hydrogen atoms which provide sites for the formation of free radicals, and from 5 to 95% by weight of a highly hydrogen bonded polyhydric polymer, said polymers being coupled to each other by reaction with from 0.1 to 20% by weight of maleic anhydride.

14. A compatible composite as defined in claim 13 wherein said thermoplastic polymer is polyethylene.

15. A compatible composite as defined in claim 13 wherein said thermoplastic polymer is a copolymer of ethylene and vinyl acetate.

16. A compatible composite as defined in claim 13 wherein said polyhydric polymer is a member selected from the group consisting of polysaccharides, polyvinyl alcohol and mixtures thereof.

17. A compatible composite as defined in claim 13 wherein said highly hydrogen bonded polyhydric polymer is cellulose.

18. A compatible composite as defined in claim 13 wherein said thermoplastic polymer is selected from the group consisting of olefin polymers and vinyl polymers.

References Cited

UNITED STATES PATENTS

| | | | |
|---|---|---|---|
| 2,789,030 | 4/1957 | Fetscher | 260—17.4 X |
| 3,044,972 | 7/1962 | Segro et al. | 260—17 |
| 3,088,791 | 5/1963 | Cline et al. | 8—115.5 |
| 3,127,362 | 3/1964 | Cohen et al. | 260—17.4 |
| 3,297,786 | 1/1967 | Horowitz | 260—857 |
| 3,310,608 | 3/1967 | Matsubayashi et al. | 260—897 |
| 3,325,437 | 6/1967 | Peters et al. | 260—31.8 |
| 3,374,198 | 3/1968 | Falcone et al. | 260—41 |
| 3,483,276 | 12/1969 | Mahlman | 260—897 |
| 3,499,822 | 3/1970 | Ole-Bendt Rasmussen | 161—169 |

FOREIGN PATENTS

| | | | |
|---|---|---|---|
| 586,198 | 7/1943 | Great Britain | 260—17.4 |

MELVIN GOLDSTEIN, Primary Examiner

U.S. Cl. X.R.

260—17 A, 875, 878, 884, 886